(12) United States Patent
Ishii et al.

(10) Patent No.: US 9,529,094 B2
(45) Date of Patent: Dec. 27, 2016

(54) RADIATION IMAGING APPARATUS AND RADIATION IMAGING SYSTEM

(71) Applicant: CANON KABUSHIKI KAISHA, Tokyo (JP)

(72) Inventors: Takamasa Ishii, Honjo (JP); Masato Inoue, Kumagaya (JP); Kota Nishibe, Honjo (JP); Shinji Ono, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/842,110

(22) Filed: Sep. 1, 2015

(65) Prior Publication Data
US 2016/0070002 A1    Mar. 10, 2016

(30) Foreign Application Priority Data
Sep. 10, 2014    (JP) ................. 2014-184541

(51) Int. Cl.
*G01T 1/164*    (2006.01)
*G01T 1/20*    (2006.01)

(52) U.S. Cl.
CPC ........... *G01T 1/1642* (2013.01); *G01T 1/2018* (2013.01)

(58) Field of Classification Search
CPC .............................. G01T 1/1642; G01T 1/2018
See application file for complete search history.

(56) References Cited

U.S. PATENT DOCUMENTS

| | | | |
|---|---|---|---|
| 4,418,452 A | 12/1983 | Kühl et al. ...................... 445/35 |
| 6,972,410 B2 | 12/2005 | Takeda ..................... 250/370.09 |
| 7,256,404 B2 | 8/2007 | Inoue et al. ............. 250/370.11 |
| 7,391,029 B2 | 6/2008 | Takeda et al. ........... 250/370.11 |
| 7,470,908 B2 | 12/2008 | Ishii et al. ................ 250/370.08 |
| 7,514,686 B2 | 4/2009 | Ogawa et al. ............ 250/361 R |
| 7,595,493 B2 | 9/2009 | Okada et al. ............ 250/370.11 |
| 7,692,152 B2 | 4/2010 | Inoue ........................ 250/361 R |

(Continued)

FOREIGN PATENT DOCUMENTS

| | | |
|---|---|---|
| EP | 1598862 | 8/2009 |
| JP | 2005-195643 | 7/2005 |

(Continued)

OTHER PUBLICATIONS

GB_CESR issued on Jan. 12, 2016 in counterpart British patent application 1515895.9.

(Continued)

*Primary Examiner* — Marcus Taningco
(74) *Attorney, Agent, or Firm* — Fitzpatrick, Cella, Harper & Scinto (57) ABSTRACT

A radiation imaging apparatus for sensing a radiation image, includes a radiation imaging panel including a plurality of imaging substrates and a scintillator having a first face and a second face which oppose each other, a housing configured to house the radiation imaging panel and including a first plate-shaped portion and a second plate-shaped portion, a first support member located between the first face of the scintillator and the first plate-shaped portion of the housing so as to support the scintillator via the plurality of imaging substrates, and a second support member located between the second face of the scintillator and the second plate-shaped portion of the housing so as to support the scintillator.

18 Claims, 6 Drawing Sheets

(56) References Cited

U.S. PATENT DOCUMENTS

| | | | |
|---|---|---|---|
| 7,723,693 B2 | 5/2010 | Okada et al. | 250/370.01 |
| 7,897,930 B2 | 3/2011 | Mochizuki et al. | 250/370.09 |
| 7,952,058 B2 | 5/2011 | Nomura et al. | 250/208.1 |
| 8,115,177 B2 | 2/2012 | Takeda et al. | 250/370.11 |
| 8,653,463 B2 | 2/2014 | Sawada et al. | 250/361 R |
| 8,957,383 B2 | 2/2015 | Sasaki et al. | 250/361 R |
| 9,081,104 B2 | 7/2015 | Sawada et al. | G01T 1/2002 |
| 2006/0071172 A1 | 4/2006 | Ertel et al. | 250/370.11 |
| 2007/0085015 A1* | 4/2007 | Castleberry | G01T 1/2018 250/370.09 |
| 2007/0272873 A1 | 11/2007 | Jadrich et al. | 250/370.11 |
| 2009/0065703 A1 | 3/2009 | Jadrich et al. | 250/370.11 |
| 2011/0222659 A1* | 9/2011 | Jorritsma | G01T 1/00 378/62 |
| 2012/0126128 A1* | 5/2012 | Watanabe | G01T 1/2928 250/369 |
| 2012/0318990 A1 | 12/2012 | Tsujii et al. | 250/366 |
| 2013/0020493 A1 | 1/2013 | Ishii et al. | 250/394 |
| 2013/0092840 A1 | 4/2013 | Ohta et al. | 250/361 |
| 2013/0187054 A1 | 7/2013 | Ishii et al. | 250/367 |
| 2013/0221198 A1 | 8/2013 | Sawada et al. | 250/208.1 |
| 2013/0301808 A1 | 11/2013 | Koyanagi | 379/189 |
| 2013/0341517 A1 | 12/2013 | Inoue et al. | 250/363.02 |
| 2014/0124676 A1 | 5/2014 | Hedler et al. | 250/366 |
| 2014/0284486 A1 | 9/2014 | Inoue et al. | 250/367 |
| 2015/0078530 A1* | 3/2015 | Hawver | A61B 6/4225 378/98 |
| 2015/0131785 A1* | 5/2015 | Topfer | A61B 6/4233 378/98 |

FOREIGN PATENT DOCUMENTS

| | | |
|---|---|---|
| JP | 2011-070060 | 4/2011 |
| JP | 2012-247401 | 12/2012 |
| RU | 2479003 | 4/2013 |
| WO | 2011/037153 | 3/2011 |

OTHER PUBLICATIONS

Russian Office Action issued on May 18, 2016 in counterpart Russian patent application 2015138502, with translation.

* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

In recent years, a radiation imaging apparatus having a large area of, for example, 40 cm×40 cm has been developed. To implement such radiation imaging apparatus having a large area, in a radiation imaging apparatus having a stacked structure of a sensor panel and a scintillator, the sensor panel is formed by a plurality of imaging substrates. For example, Japanese Patent Laid-Open No. 2012-247401 describes a radiation imaging apparatus having a stacked structure of a sensor panel and a scintillator, in which the sensor panel is formed by arranging a plurality of image sensors.

However, in the stacked structure of the scintillator and the sensor panel formed by arranging the plurality of imaging substrates, a deformation at a joint between the imaging substrates can be larger than that in the imaging substrate. Such deformation nonuniformity causes nonuniform distortion of the scintillator, resulting in an artifact in an image sensed by the radiation imaging apparatus.

SUMMARY OF THE INVENTION

One aspect of the present invention provides a technique advantageous in reducing the distortion of a scintillator in a radiation imaging apparatus having a stacked structure of the scintillator and a sensor panel formed by a plurality of imaging substrates.

A first aspect of the present invention provides a radiation imaging apparatus for sensing a radiation image, comprising: a radiation imaging panel including a plurality of imaging substrates and a scintillator having a first face and a second face which oppose each other; a housing configured to house the radiation imaging panel and including a first plate-shaped portion and a second plate-shaped portion; a first support member located between the first face of the scintillator and the first plate-shaped portion of the housing so as to support the scintillator via the plurality of imaging substrates; and a second support member located between the second face of the scintillator and the second plate-shaped portion of the housing so as to support the scintillator.

A second aspect of the present invention provides a radiation imaging system comprising: a radiation source; and a radiation imaging apparatus as specified as the first aspect of the present invention.

Further features of the present invention will become apparent from the following description of exemplary embodiments (with reference to the attached drawings).

DESCRIPTION OF THE EMBODIMENTS

The present invention will be described below through exemplary embodiments with reference to the accompanying drawings.

Figure 1:
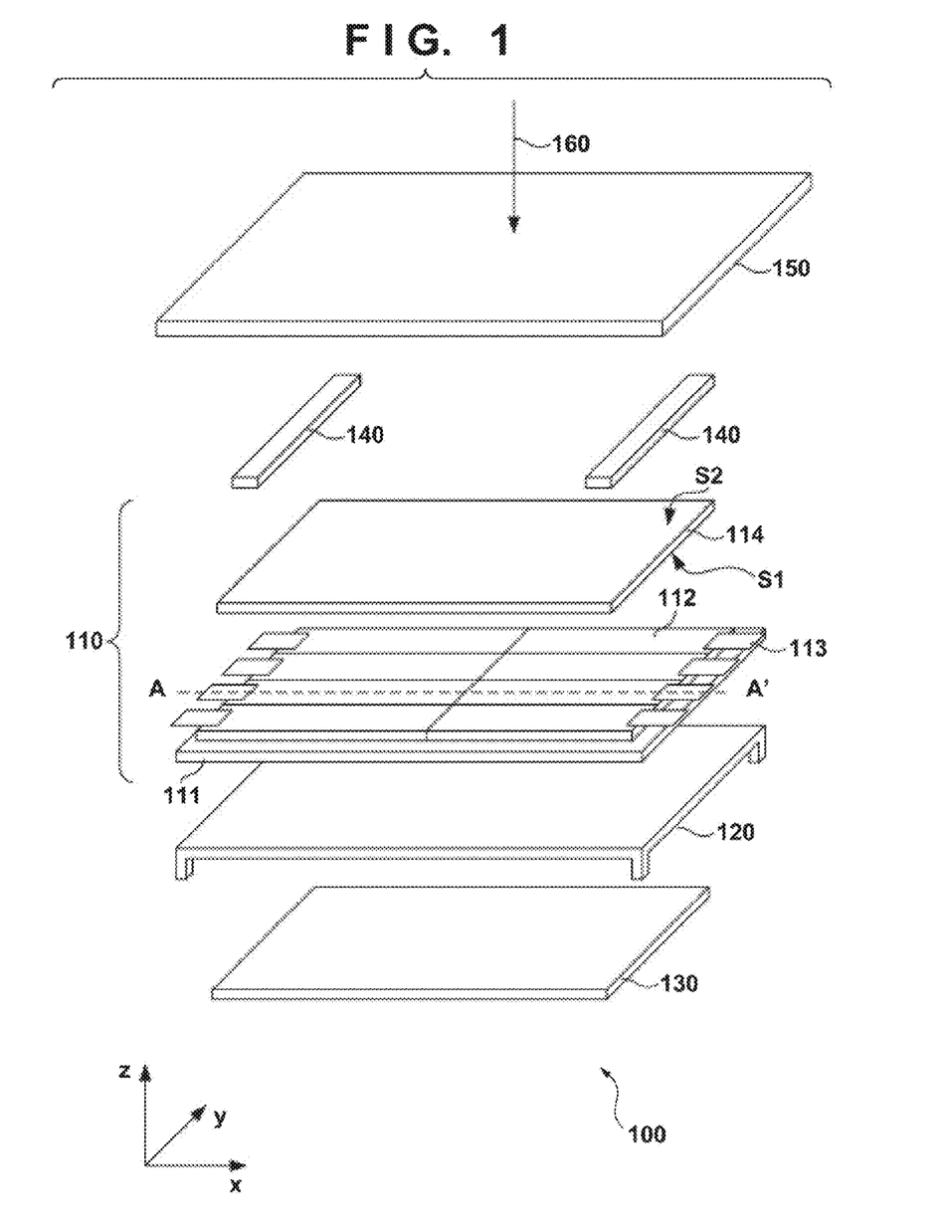
FIG. 1 is a perspective view separately showing components of a radiation imaging apparatus according to a first embodiment of the present invention.
Figure 2A:
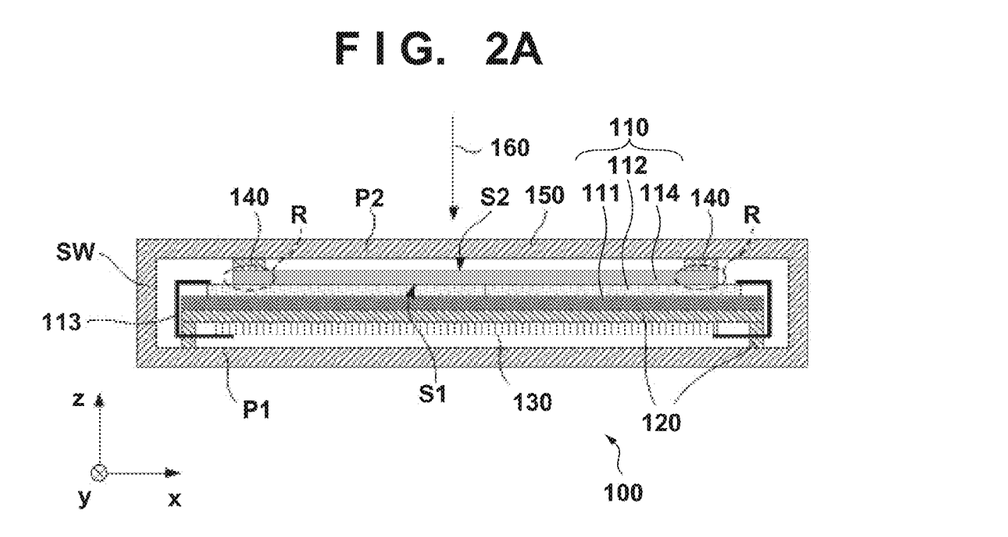
FIGS. 2A and 2B are a sectional view and plan view, respectively, showing the radiation imaging apparatus according to the first embodiment of the present invention.
Figure 2B:
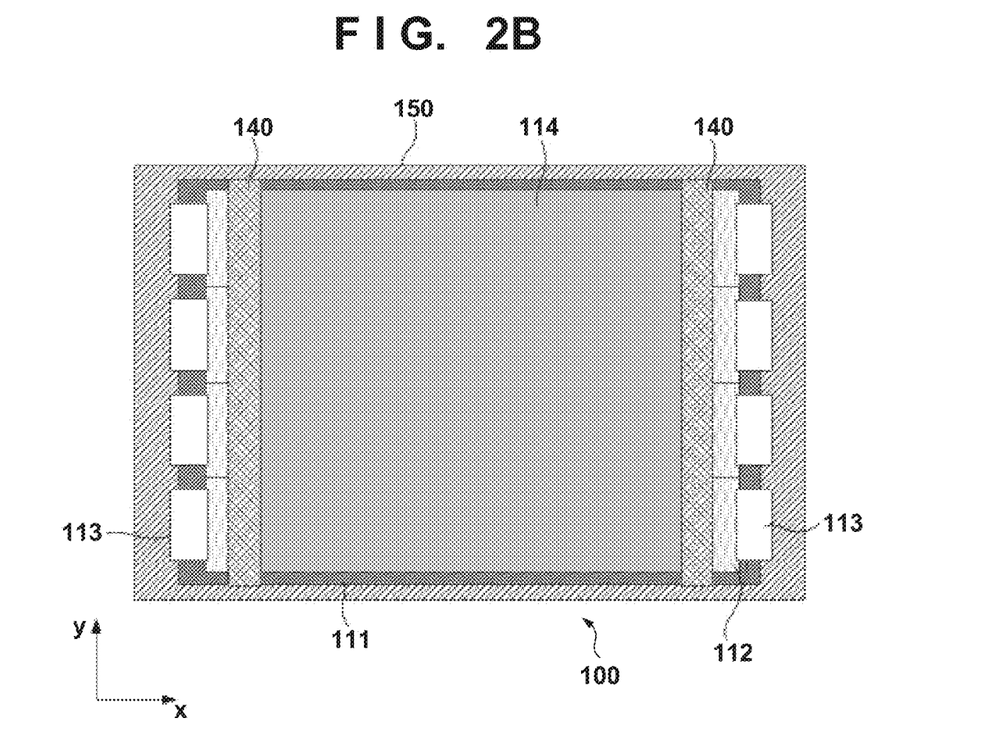

FIG. 1 separately shows components of a radiation imaging apparatus 100 according to the first embodiment of the present invention. FIG. 2A is a sectional view taken along a line A-A' shown in FIG. 1 and showing the radiation imaging apparatus 100, and FIG. 2B is a plan view showing the radiation imaging apparatus 100. Note that FIG. 1 shows only part of a housing 150, and FIG. 2B shows the housing 150 by removing its upper portion.

The radiation imaging apparatus 100 is configured to sense an image (radiation image) formed by radiation which has been emitted from a radiation source for emitting radiation such as X-rays, and passed through an object. The radiation imaging apparatus 100 includes, for example, a radiation imaging panel 110, a first support member 120, a second support member 140, a circuit substrate 130, and the housing (exterior member) 150. The radiation imaging panel 110 includes, for example, a plurality of imaging substrates 112, and a scintillator 114 having a first face S1 and a second face S2 which oppose each other. The radiation imaging apparatus 100 or the radiation imaging panel 110 may further include a base 111 for supporting the plurality of imaging substrates 112.

The scintillator 114 may be located such that the plurality of imaging substrates 112 are sandwiched or arranged between the scintillator 114 and the base 111, or located such that the scintillator 114 is sandwiched or arranged between the plurality of imaging substrates 112 and the base 111. The scintillator 114 can be an aggregate of columnar structures made of Tl-doped CsI. The scintillator 114 converts radiation 160 into light. The plurality of imaging substrates 112 are arranged one- or two-dimensionally to form an imaging plane or imaging area. Each imaging substrate 112 can have a rectangular shape with short sides and long sides. A flexible circuit substrate 113 is connected to each imaging substrate 112. Each imaging substrate 112 can be, for example, a CMOS sensor made of crystal silicon, or a PIN sensor or MIS sensor made of amorphous silicon. Each imaging substrate 112 includes a plurality of pixels for detecting light converted from radiation by the scintillator 114. Each pixel includes a photoelectric converter.

The housing 150 is configured to house the radiation imaging panel 110, and has a first plate-shaped portion P1, a second plate-shaped portion P2, and a side wall SW. The incident side of the radiation 160 is the side of the second plate-shaped portion P2. The first plate-shaped portion P1 and the second plate-shaped portion P2 are located to face each other, and the side wall SW bonds the first plate-shaped portion P1 and the second plate-shaped portion P2. The first support member 120 is located between the first face S1 of the scintillator 114 and the first plate-shaped portion P1 of the housing 150 so as to support the scintillator 114 or the radiation imaging panel 110. Part of the first support member 120 can be bonded directly or indirectly to the radiation imaging panel 110, and another part of the first support member 120 can be bonded directly or indirectly to the first plate-shaped portion P1 of the housing 150. The second support member 140 is located between the second face S2 of the scintillator 114 and the second plate-shaped portion P2 of the housing 150 so as to support the scintillator 114 or the radiation imaging panel 110. Part of the second support member 140 can be bonded directly or indirectly to the radiation imaging panel 110, and another part of the second support member 140 can be bonded directly or indirectly to the second plate-shaped portion P2 of the housing 150.

The circuit substrate 130 can be located between the first support member 120 and the first plate-shaped portion P1 of the housing 150, and the circuit substrate 130 can be supported by the first support member 120. The circuit substrate 130 is connected to the plurality of imaging substrates 112 by the flexible circuit substrates 113. The circuit substrate 130 drives the plurality of imaging substrates 112, and processes signals output from the plurality of imaging substrates 112.

A space (gap) is provided between the second plate-shaped portion P2 of the housing 150 and the radiation imaging panel 110 or scintillator 114. This can prevent the housing 150 and the radiation imaging panel 110 from being brought into contact each other even when an external pressure is applied to the radiation imaging apparatus 100 to deform the housing 150, thereby preventing damage to the radiation imaging panel 110 or scintillator 114.

On the other hand, when a vibration is applied to the radiation imaging apparatus 100 or the radiation imaging apparatus 100 is maintained to set a horizontal or oblique imaging plane, the radiation imaging panel 110 can be deformed. Typically, a deformation of the radiation imaging panel 110 at a joint between the imaging substrates 112 can be larger than a deformation of the radiation imaging panel 110 in the individual imaging substrates 112. Such nonuniformity of the deformation causes nonuniform distortion of the scintillator 114, resulting in an artifact in an image sensed by the radiation imaging apparatus 100. As the number of the imaging substrates 112 increases, the distortion of the radiation imaging panel 110 becomes larger.

There is provided a method of increasing the thickness of the base 111 to reduce the distortion of the radiation imaging panel 110. In such method, however, the thickness and weight of the radiation imaging apparatus 100 also increase. In addition, only increasing the thickness of the base 111 exerts a limitation on reducing an artifact. To solve this problem, in the first embodiment, the second support member 140 is located between the second face S2 of the scintillator 114 and the second plate-shaped portion P2 of the housing 150 so as to support the radiation imaging panel 110. The second support member 140 can be configured to support the peripheral portion of the scintillator 114 and not to support the central portion inside the peripheral portion. From another viewpoint, the second support member 140 can be configured to support the scintillator 114 at a portion or area outside an imaging area which is formed by the plurality of imaging substrates 112.

Figure 6A:
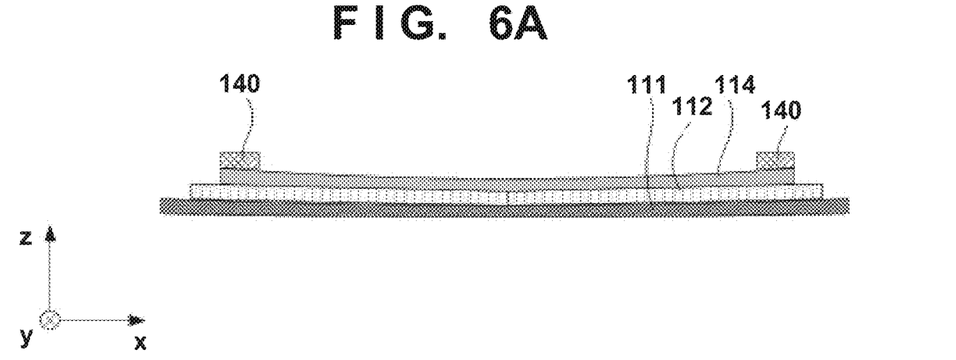
FIGS. 6A and 6B are views each schematically showing the relationship between a support mode and the flexure (distortion) of a scintillator (or radiation imaging panel)
Figure 6B:
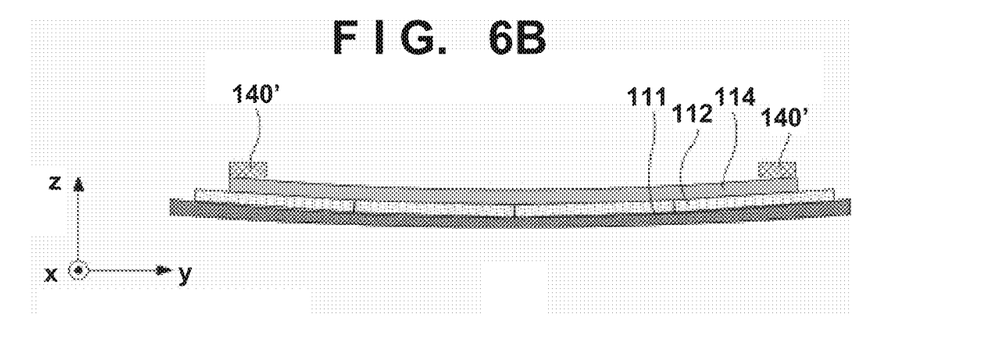

Each imaging substrate 112 has a rectangular shape with short sides and long sides. In an array of the plurality of imaging substrates 112 in the x and y directions, the number (4 in the example shown in FIGS. 1, 2A, and 2B) of imaging substrates 112 arranged in the y direction (first direction) is larger than the number (2 in the example shown in FIGS. 1, 2A, and 2B) of imaging substrates 112 arranged in the x direction (second direction) perpendicular to the y direction. The second support member 140 is preferably configured to support the peripheral portion of the scintillator 114 by at least portions extending in the y direction (first direction). The reason for this will be explained with reference to FIGS. 6A and 6B. FIG. 6A schematically shows a case in which the second support member 140 supports the peripheral portion of the scintillator 114 by portions extending in the y direction (first direction). FIG. 6B schematically shows a case in which a second support member 140' extending in the x direction (second direction) supports the peripheral portion of the scintillator 114. The amount of distortion (flexure) of the scintillator 114 (or radiation imaging panel) in the support mode shown in FIG. 6A is smaller than that in the support mode shown in FIG. 6B. That is, the support mode shown in FIG. 6A is superior to that shown in FIG. 6B. This is because the mechanical strength at the joint between the imaging substrates 112 (the mechanical strength between the imaging substrates 112) is low, and the scintillator 114 (or radiation imaging panel) readily bends in that portion.

In the example shown in FIGS. 1, 2A, and 2B, the plurality of imaging substrates 112 are arranged to form the first and second columns each extending along the y direction (first direction). The second support member 140 includes the first portion which supports, via the scintillator 114, the imaging substrates 112 which form the first column among the plurality of imaging substrates 112, and a second portion which supports, via the scintillator 114, the imaging substrates 112 forming the second column among the plurality of imaging substrates 112. Note that the first portion corresponds to the second support member 140 on the left side in FIGS. 1, 2A, and 2B and the second portion corresponds to the second support member 140 on the right side in FIGS. 1, 2A, and 2B.

Figure 3A:
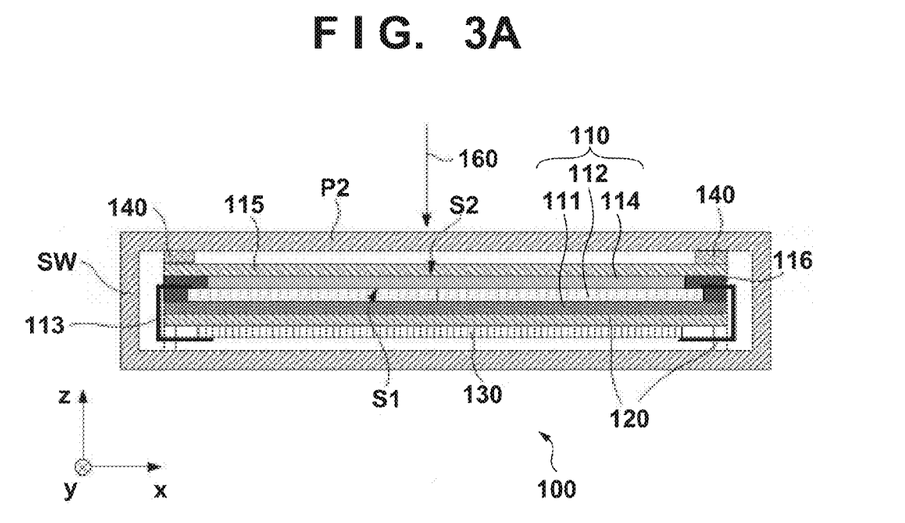
FIGS. 3A and 3B are a sectional view and plan view, respectively, showing a radiation imaging apparatus according to a second embodiment of the present invention.
Figure 3B:
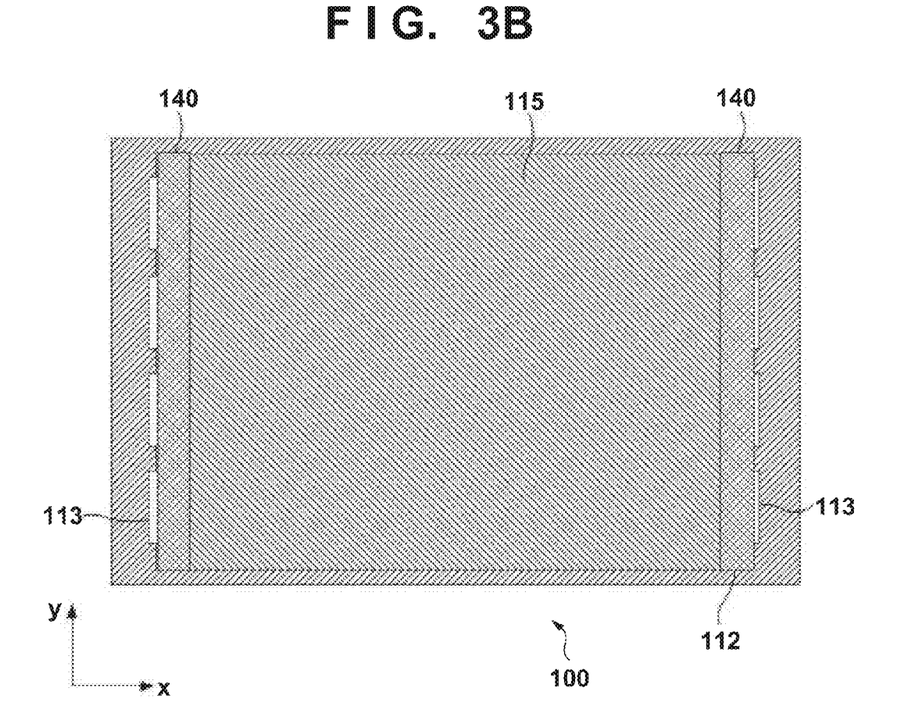

The arrangement of a radiation imaging apparatus 100 according to the second embodiment of the present invention will be described with reference to FIGS. 3A and 3B. Note that details not mentioned in the second embodiment can conform to those in the first embodiment. FIGS. 3A and 3B correspond to FIGS. 2A and 2B, respectively. The radiation imaging apparatus 100 according to the second embodiment includes a support plate 115 between a second face S2 of a scintillator 114 and a second support member 140 so as to support the scintillator 114 (or a radiation imaging panel 110). One face of the support plate 115 is bonded directly or indirectly to the scintillator 114 (or radiation imaging panel 110), and the other face of the support plate 115 is bonded directly or indirectly to the second support member 140. The support plate 115 can have an area to support the entire second face S2 of the scintillator 114. The support plate 115 can be located such that a plurality of imaging substrates 112 and the scintillator 114 are sandwiched or arranged between a base 111 and the support plate 115. The support plate 115 needs to be a member and have a thickness so as to transmit radiation. The support plate 115 can be made of, for example, amorphous carbon, CFRP, aluminum, or titanium.

The radiation imaging apparatus 100 according to the second embodiment can further include a bonding member 116 for bonding the base 111 and the support plate 115 at an area outside an area where the plurality of imaging substrates 112 and the scintillator 114 are arranged. The bonding member 116 can be made of, for example, a resin such as a silicone resin, acrylic resin, epoxy resin, or polyurethane resin. For example, the bonding member 116 can be located to surround the plurality of imaging substrates 112 and the scintillator 114 partially or wholly. The plurality of imaging substrates 112 can be supported by the second support member 140 via the bonding member 116 and the support plate 115. The second support member 140 can be configured to support the support plate 115 in an area outside an area where the scintillator 114 is located. This structure is advantageous in extending an effective pixel area.

Figure 4A:
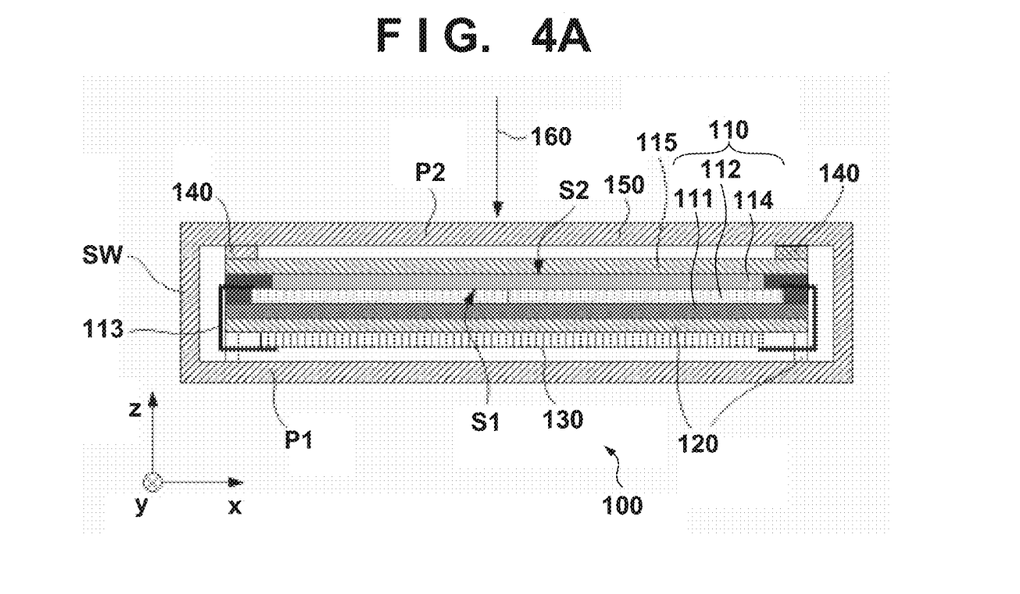
FIGS. 4A and 4B are sectional views taken along two directions and showing a radiation imaging apparatus according to a third embodiment of the present invention.
Figure 4B:
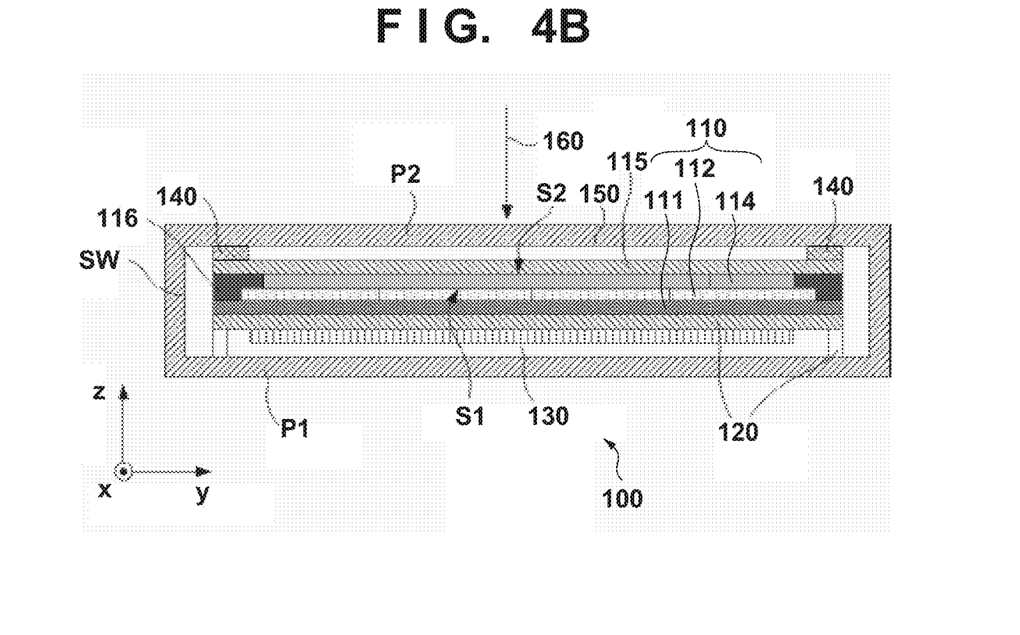
Figure 5:
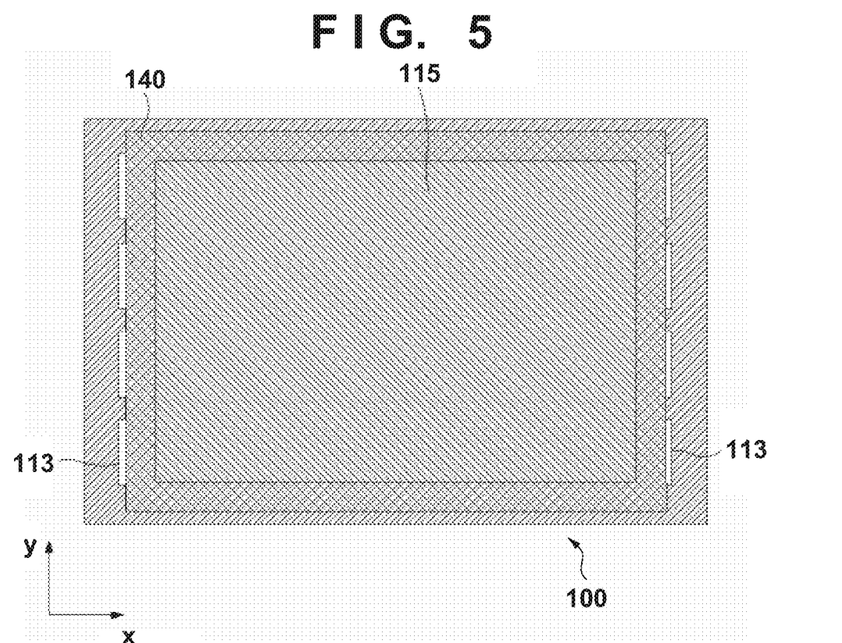
FIG. 5 is a plan view showing the radiation imaging apparatus according to the third embodiment of the present invention.

The arrangement of a radiation imaging apparatus 100 according to the third embodiment of the present invention will be described with reference to FIGS. 4A, 4B, and 5. Note that details not mentioned in the third embodiment can conform to those in the first or second embodiment. FIG. 4A corresponds to FIG. 2A, and FIG. 5 corresponds to FIG. 2B. FIG. 4B is a sectional view taken along a direction perpendicular to a cross section shown in FIG. 4A. In the third embodiment, a second support member 140 is configured to support the four sides of a scintillator 114. That is, in the third embodiment, the second support member 140 supports the peripheral portion of the scintillator 114 by a portion extending in the first direction (y direction) and a portion extending in the second direction (x direction).

Figure 7:
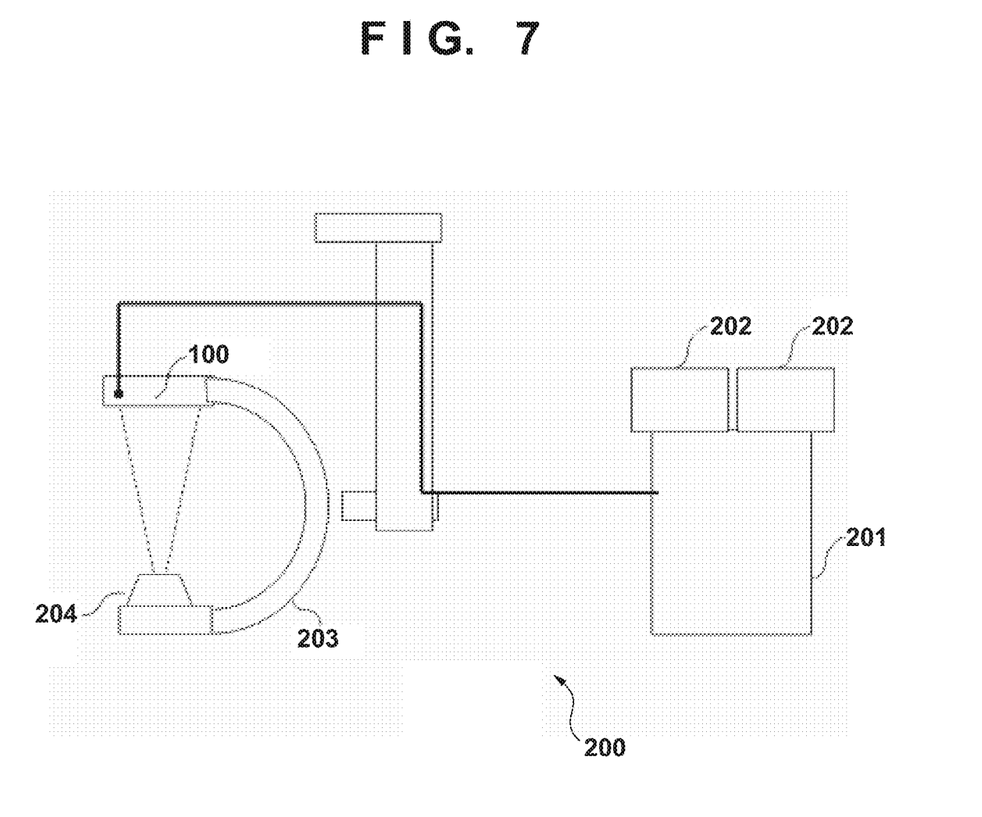
FIG. 7 is a view showing the configuration of a radiation imaging system according to one embodiment of the present invention.

A radiation imaging system 200 according to one embodiment of the present invention will be described below with reference to FIG. 7. The radiation imaging system 200 includes a radiation source 204 for emitting radiation such as X-rays, the above-described radiation imaging apparatus 100 for receiving the radiation emitted from the radiation source 204 through an object, and a control unit 201. In this embodiment, the radiation imaging system 200 is configured as a C-arm type radioscopic diagnosis apparatus. That is, the radiation source 204 and the radiation imaging apparatus 100 are attached to a rotatable C-arm 203 so as to face each other. It is possible to change the irradiating direction of the radiation toward the object by rotating the C-arm 203 without changing the posture of the object. This allows 3D (three-dimensional) radiation imaging. Each radiation image sensed by the radiation imaging apparatus 100 is provided to the control unit 201, and processed by the control unit 201. An obtained 3D image can be output to a display unit 202.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-184541, filed Sep. 10, 2014, which is hereby incorporated by reference herein in its entirety.

What is claimed is:

1. A radiation imaging apparatus for sensing a radiation image, comprising:
    a radiation imaging panel including a plurality of imaging substrates and a scintillator having a first face and a second face which oppose each other, each of the plurality of imaging substrates having a plurality of pixels each configured to detect light converted from radiation by the scintillator, the number of imaging substrates arranged in a first direction in an array of the plurality of imaging substrates being larger than the number of imaging substrates arranged in a second direction perpendicular to the first direction in the array;
    a housing configured to house the radiation imaging panel and including a first plate-shaped portion and a second plate-shaped portion;
    a first support member located between the first face of the scintillator and the first plate-shaped portion of the housing so as to support the scintillator via the plurality of imaging substrates; and
    a second support member located between the second face of the scintillator and the second plate-shaped portion of the housing so as to support the scintillator, wherein the second support member includes a portion extending in the first direction, the second support member is configured to support a peripheral portion of the scintillator, which extends in the first direction, by the portion and not to support a central portion of the scintillator, which is inside the peripheral portion.

2. The apparatus according to claim 1, further comprising:
    a support plate located between the second face of the scintillator and the second support member so as to support the scintillator.

3. The apparatus according to claim 2, wherein the support plate has an area to support the entire second face of the scintillator.

4. The apparatus according to claim 2, further comprising:
    a base configured to support the plurality of imaging substrates,
    wherein the first support member supports the scintillator via the base and the plurality of imaging substrates.

5. The apparatus according to claim 4, wherein the support plate is located such that the plurality of imaging substrates and the scintillator are sandwiched between the base and the support plate.

6. The apparatus according to claim 5, further comprising:
    a bonding member configured to bond the base and the support plate at an area outside an area where the plurality of imaging substrates and the scintillator are arranged.

7. The apparatus according to claim 1, wherein
    each of the plurality of imaging substrates has a rectangular shape with short sides and long sides, and
    the peripheral portion is a portion arranged outside an imaging area which is formed by the plurality of imaging substrates.

8. The apparatus according to claim 7, wherein the plurality of imaging substrates are arranged to form a first column and a second column each extending along the first direction, and the portion of the second support member includes a first portion extending in the first direction and configured to support, via the scintillator, the imaging substrates forming the first column among the plurality of imaging substrates, and a second portion extending in the first direction and configured to support, via the scintillator, the imaging substrates forming the second column among the plurality of imaging substrates.

9. The apparatus according to claim 8, wherein each of the first and second portions of the second support member includes a first part connected directly or indirectly to the radiation imaging panel and a second part connected directly or indirectly to the second plate-shaped portion.

10. The apparatus according to claim 9, wherein the housing includes a side wall connecting the first plate-shaped portion and the second plate-shaped portion, and the second support member is not connected to the side wall.

11. The apparatus according to claim 8, wherein each of the first and second portions of the second support member includes a first part connected directly to the radiation imaging panel and a second part connected directly to the second plate-shaped portion.

12. The apparatus according to claim 1, wherein each of the plurality of imaging substrates has a rectangular shape with short sides and long sides, the housing has a rectangular shape with shot sides and long sides, and the long sides of the housing are parallel to the long sides of each of the plurality of imaging substrates.

13. The apparatus according to claim 1, wherein the second support member is configured to support four sides of the scintillator.

14. The apparatus according to claim 1, wherein the portion of the second support member includes a first part connected directly or indirectly to the radiation imaging panel and a second part connected directly or indirectly to the second plate-shaped portion.

15. The apparatus according to claim 14, wherein the housing includes a side wall connecting the first plate-shaped portion and the second plate-shaped portion, and the second support member is not connected to the side wall.

16. The apparatus according to claim 1, wherein the portion of the second support member includes a first part connected directly to the radiation imaging panel and a second part connected directly to the second plate-shaped portion.

17. A radiation imaging system comprising:
a radiation source; and
a radiation imaging apparatus located to detect radiation emitted from the radiation source for sensing a radiation image,
the radiation imaging apparatus comprising:
a radiation imaging panel including a plurality of imaging substrates and a scintillator having a first face and a second face which oppose each other, each of the plurality of imaging substrates having a plurality of pixels each configured to detect light converted from radiation by the scintillator, the number of imaging substrates arranged in a first direction in an array of the plurality of imaging substrates being larger than the number of imaging substrates arranged in a second direction perpendicular to the first direction in the array;
a housing configured to house the radiation imaging panel and including a first plate-shaped portion and a second plate-shaped portion;
a first support member located between the first face of the scintillator and the first plate-shaped portion of the housing so as to support the scintillator via the plurality of imaging substrates; and
a second support member located between the second face of the scintillator and the second plate-shaped portion of the housing so as to support the scintillator, wherein the second support member includes a portion extending in the first direction, the second support member is configured to support a peripheral portion of the scintillator, which extends in the first direction, by the portion and not to support a central portion of the scintillator, which is inside the peripheral portion.

18. The apparatus according to claim 17, wherein the radiation source and the radiation imaging apparatus are attached to a rotatable C-arm so as to face each other.

* * * * *